United States Patent
Reuschenbach et al.

(10) Patent No.: US 6,959,254 B2
(45) Date of Patent: Oct. 25, 2005

(54) METHOD AND DEVICE FOR CONTROLLING AND/OR DIAGNOSING A CONTROL SYSTEM THAT INFLUENCES A MASS FLOW

(75) Inventors: Lutz Reuschenbach, Stuttgart (DE); Oliver Schlesiger, Asperg (DE); Ernst Wild, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 10/108,674

(22) Filed: Mar. 28, 2002

(65) Prior Publication Data

US 2002/0169573 A1    Nov. 14, 2002

(30) Foreign Application Priority Data

Mar. 28, 2001 (DE) .................... 101 15 750

(51) Int. Cl.[7] .............. G01F 1/12; G01F 1/50; G06F 19/00; G01N 35/06; G01N 15/00
(52) U.S. Cl. ............. 702/100; 73/1.34; 73/117.3; 73/118.1; 123/568.21; 701/110; 436/144; 454/74
(58) Field of Search .............. 702/45, 46, 47, 702/50, 53, 100, 107; 73/1.34, 1.35, 118.2, 73/118.1, 115, 116, 117.2, 117.3, 119 A, 73/861.42; 701/31, 101, 102, 108; 123/520, 123/568.21, 676, 690, 698; 436/144; 454/74

(56) References Cited

U.S. PATENT DOCUMENTS

| | | | | |
|---|---|---|---|---|
| 5,468,642 A | * | 11/1995 | Charpentier | 436/144 |
| 5,870,688 A | * | 2/1999 | Kanbara et al. | 701/110 |
| 5,884,610 A | * | 3/1999 | Reddy | 123/520 |
| 5,974,870 A | * | 11/1999 | Treinies et al. | 73/118.2 |
| 6,016,460 A | * | 1/2000 | Olin et al. | 701/102 |
| 6,021,677 A | * | 2/2000 | Hepner | 73/861.42 |
| 6,216,676 B1 | * | 4/2001 | Gotoh et al. | 123/568.21 |
| 6,298,718 B1 | * | 10/2001 | Wang | |
| 6,367,319 B2 | * | 4/2002 | Hartkr et al. | 73/117.3 |
| 6,370,935 B1 | * | 4/2002 | He et al. | 73/1.34 |
| 6,544,114 B2 | * | 4/2003 | Buchholz | 454/74 |

FOREIGN PATENT DOCUMENTS

DE    198 28 035    12/1999

* cited by examiner

Primary Examiner—Bryan Bui
Assistant Examiner—John Le
(74) Attorney, Agent, or Firm—Kenyon & Kenyon

(57) ABSTRACT

A method and a device are proposed for controlling and/or diagnosing a control system influencing a mass flow. In this context, a correction value is calculated, which corrects the controlling, or is evaluated for diagnostic purposes. The correction value, in this context, is derived from the line resistance of the mass flow line.

4 Claims, 3 Drawing Sheets

US 6,959,254 B2

METHOD AND DEVICE FOR CONTROLLING AND/OR DIAGNOSING A CONTROL SYSTEM THAT INFLUENCES A MASS FLOW

FIELD OF THE INVENTION

The present invention relates to a method and a device for controlling and/or diagnosing a control system that influences a mass flow.

BACKGROUND INFORMATION

Systems are known which influence a mass flow, specifically a gas mass flow, in particular in connection with the control system of internal combustion engine. Examples of systems of this type are control systems for exhaust-gas recirculation, via which the mass flow of the exhaust gas is influenced by a control element, or valve control systems, which control the air mass flow to the internal combustion engine via an electrically controllable throttle valve. In each case, control elements are employed to control the mass flow. It has become clear that, over the course of operation, the line cross-section can become constricted as a result of contaminants. This is also the case in exhaust-gas recirculation systems that are cited as an example, in which, as a result of deposits of solid particles from the exhaust-gas and the intake system, the control valve and/or the line, over time, can be obstructed, and therefore the recycled exhaust-gas quantity can decrease as the operating time of the internal combustion engine increases. Then the control function of the internal combustion engine is no longer optimal. For this reason, it is important to monitor the functioning of a control system of this type and/or to take measures for adjusting the control system, which compensate for fault-based changes of this kind in the mass-flow throughput.

In connection with exhaust-gas recirculation valves, control concepts are known for compensating for changes of this type. From unpublished German Patent Application No. 100 41 073.1, dated Aug. 22, 2000 it is known that a modeled partial pressure of the recirculated exhaust gas is derived from the flow-rate characteristic curve of the exhaust-gas recirculation valve and an intake manifold pressure is modulated with the assistance of an independent filling signal and of the calculated internal residual gas pressure. This modeled intake manifold pressure is compared to the measured intake manifold pressure. The differences that arise, within certain parameters, are interpreted as errors in the flow-rate characteristic curve of the exhaust-gas recirculation valve, and correction values for this flow-rate characteristic curve are calculated. The type of correction values (slope correction, offset correction) is determined by the type of fault situation. In this manner, it is possible to effectively compensate for constrictions in the flow cross-section both at the valve and in the line. This known solution represents a closed control loop, which as a controlled variable uses the difference between the modeled and the measured intake manifold pressure variables, and as an actuating variable uses a position input to the valve, and as a controlling concept uses integral components. The monitoring, diagnosis, or adjustment of the control system is carried out by evaluating the control interventions, or the correction variables generated by the controller. Although a satisfactory correction and monitoring/diagnosis of the mass flow control system is achieved using the known solution, nevertheless the use of the closed control loop as well as of integrators, is associated with relatively greater expense and an undesirable inertia in the correction/diagnosis.

In German Published Patent Application No. 198 28 035, the calculation of inflowing and outflowing mass flows in the intake manifold of an internal combustion engine is described.

SUMMARY OF THE INVENTION

As a result of the iterative calculation of a correction factor on the basis of the pressure and flow conditions at a restrictor, which is defined as the constricting contamination in the area of the line and/or the valve, the calculating of the correction values, the correcting, and/or the monitoring and diagnosing of the mass flow control system is not supported by one feedback control arrangement. Significant temporal advantages result because the evaluation is not a function of the control dynamic response. To formulate an assertion regarding the functioning of the control system, or to adjust the control system appropriately, it is not necessary first to achieve a stable or stationary state of the correction control loop. Rather, the correction variables are available immediately after the calculation, and they can be calculated, e.g., in the manner of a precontrol, to correct the control system, specifically to correct the control signal influencing the mass flow rate.

This calculation of correction values is advantageously used in the context of an exhaust-gas recirculation system. However, the use of the calculation of the correction values can be applied advantageously in all mass-flow lines in which there is the danger of a cross-section reduction and therefore of a reduction of the through-flow, or of a change in the flow-rate characteristic curve.

DETAILED DESCRIPTION

Figure 1:
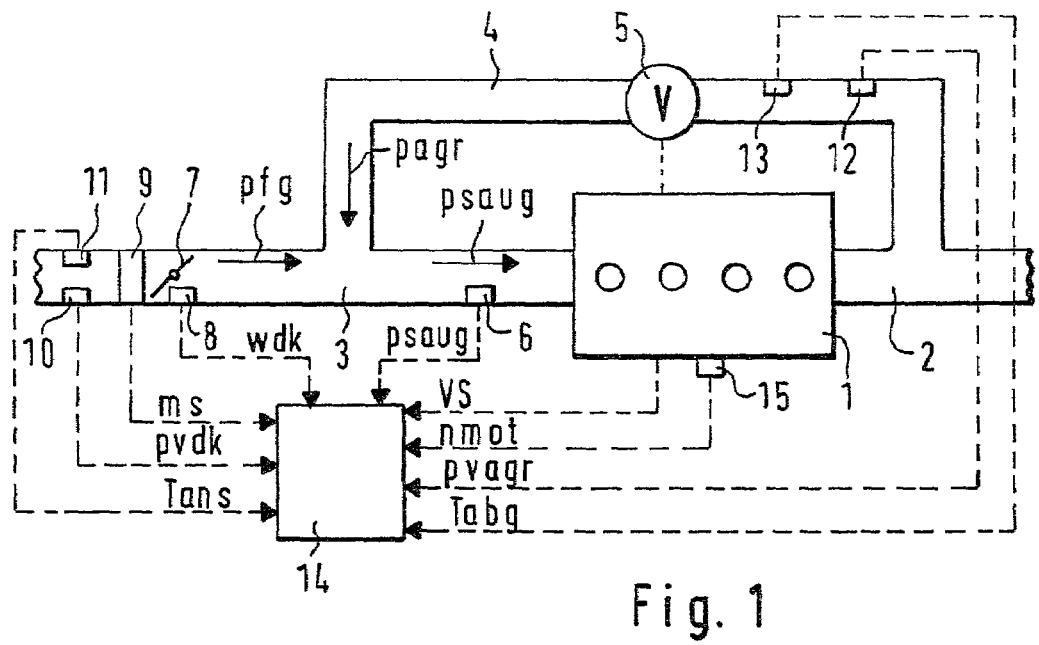
FIG. 1 depicts a representation of an internal combustion engine having an exhaust-gas and an intake system, and also having an exhaust-gas recirculation system. This specific application case represents the preferred exemplary embodiment of the mode of operation described below, but it does not restrict the application of the general idea.

FIG. 1 schematically depicts an internal combustion engine 1 having an exhaust-gas channel 2 and an intake manifold 3. From exhaust-gas channel 2, exhaust-gas recirculation line 4 branches off, emptying into intake manifold 3. Located in exhaust-gas recirculation line 4 is a valve 5. Using this exhaust-gas recirculation valve 5, it is possible to control the recirculated exhaust-gas mass, or partial pressure pagr of the recirculated exhaust gas. Downstream of the mouth of exhaust-gas recirculation line 4, in intake manifold 3, a pressure sensor 6 is arranged, which measures intake manifold pressure psaug. Located upstream of the mouth of exhaust-gas recirculation line 4 is a throttle valve 7 having a position sensor 8 that measures throttle valve position wdk. Arranged upstream of throttle valve 7, in intake manifold 3, is an air mass sensor 9, which measures inflowing air mass flow mshfm. In addition, in intake manifold 3 upstream of throttle valve 7, are a pressure sensor 10, which measures pressure pvdk in the intake manifold upstream of the valve, and a temperature sensor 11, which measures intake air temperature Tans. Arranged in exhaust-gas recirculation line 4, upstream of the exhaust gas recirculation valve, are a pressure sensor 12, which measures exhaust-gas pressure pvagr upstream of exhaust-gas recirculation valve 5, and a temperature sensor 13, which measures temperature Tabg of the exhaust gas upstream of exhaust-gas recirculation valve 5.

All the aforementioned variables obtained from sensors are supplied to a control unit 14. Among them are measured intake manifold pressure psaug, throttle valve position wdk, air mass flow mshfm, pressure pvdk upstream of the throttle valve, intake air temperature Tans, position vs of exhaust-gas recirculation valve 5 (e.g., derived from the magnitude of the valve drive signal), engine rotational speed nmot measured by a sensor 15, exhaust gas pressure pvagr upstream of the exhaust gas recirculation valve, and temperature Tabg of the exhaust gas upstream of the exhaust gas recirculation valve. Variables pvdk, Tabg, and pvagr can be determined from other operating variables of the engine using model calculations. Control unit 14, inter alia, from the aforementioned input variables, determines partial pressure pfg of the fresh gas and partial pressure pagr of the recirculated exhaust gas.

In the exhaust-gas recirculation line depicted in FIG. 1, changes in the flow characteristics can result from contaminants, so that the mass flow set for valve 5 via the drive signal variable no longer corresponds to the actual conditions. As a result of the contaminants, it is possible that the line becomes obstructed, impairing the functioning of the mass flow line. To correct the control signal and/or to diagnose the condition of the mass flow line, the assumption is made by the model of a restrictor in the mass flow line, and using the measured and/or estimated or calculated variables, the line resistance of this restrictor is calculated. This line resistance then is used as a correction, or as a diagnostic value, it being assumed when a threshold value is exceeded by the line resistance that faulty functioning exists in the area of the mass flow line and its control system.

The aforementioned problem arises not only in the case of exhaust gas recirculation systems, but also in all mass flow lines having a control element that are endangered by contaminants, so that the mode of operation described below can be used in all mass flow lines of this type.

Figure 2:
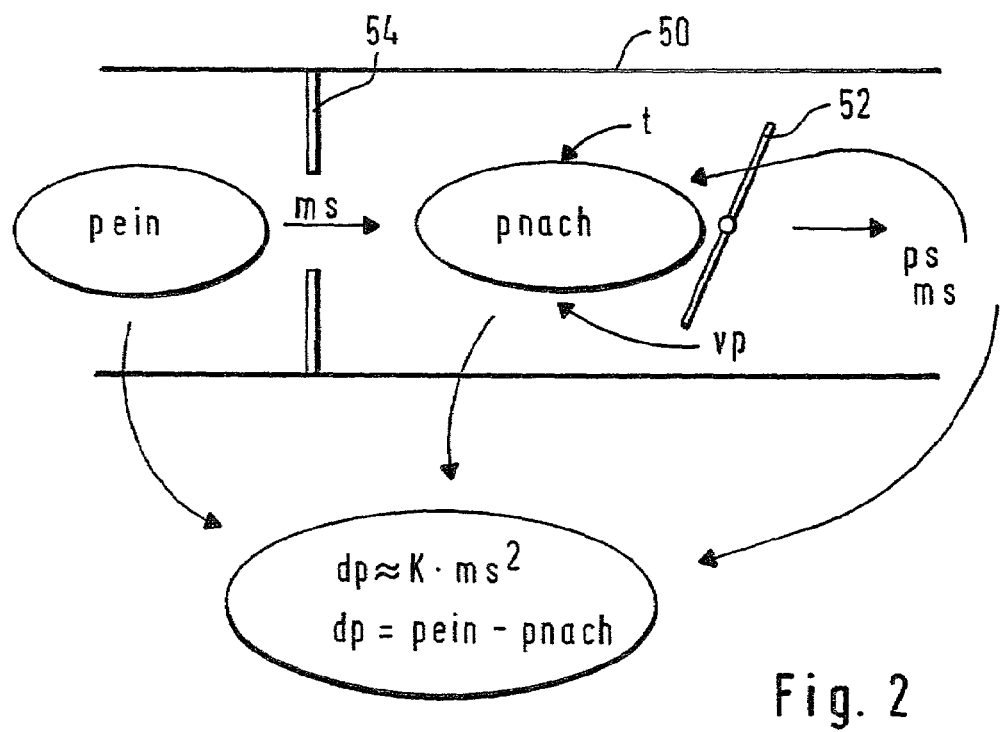
FIG. 2 presents a block diagram in which the fundamental mode of operation is shown for determining the correction value, or the line resistance value, independent of the concrete application case.

In FIG. 2, the basic principle is depicted which underlies the mode of operation described below. Schematically depicted is a cut-away portion of a mass flow line 50, in which a controllable control element (for example, a valve 52) is present. In this context, the mass flow flows in the direction of the arrow from left to right. The fouling of the mass flow line is represented by obstacle 54, which alters the cross section and therefore the flow characteristics of the mass flow line. Upstream of the obstacle in the mass flow line, an intake pressure pein predominates (in the case of the preferred exemplary embodiment of an exhaust gas recirculation system, this would be the exhaust gas counterpressure). Between obstacle 54 and valve 52, a pressure pnach predominates that diverges from intake pressure pein. Downstream of the valve, a pressure ps predominates (in the preferred exemplary embodiment of the exhaust gas recirculation system, this would be the intake manifold pressure). A mass flow ms (mass per time) flows through the line and across valve 52. In this context, the valve has a valve position vp. The gas mass flow has temperature t. To calculate line resistance K, the pressure differential across the obstacle is evaluated. Pressure differential dp across the obstacle is derived from the difference of intake pressure pein and pressure pnach. The latter, if it is not measured, can be calculated taking into account valve position vp, the pressure downstream of valve ps, and temperature t. Line resistance K is derived roughly from the relationship between the pressure differential and the mass flow flowing past the obstacle, which roughly corresponds to the mass flow across the valve. In this context, the assumption can be made of an essentially proportional relationship between the square of the mass flow and the pressure differential, the proportionality constant being line resistance K.

Calculated line resistance K represents the correction value, as a function of which the driving of valve 52 is corrected to compensate for the flow reduction as a result of the fouling, or which is evaluated for diagnosing the mass flow line. In this context, the calculation of the line resistance value is based on the evaluation of the pressure and flow conditions in the mass flow line at the location of the fouling.

Figure 3:
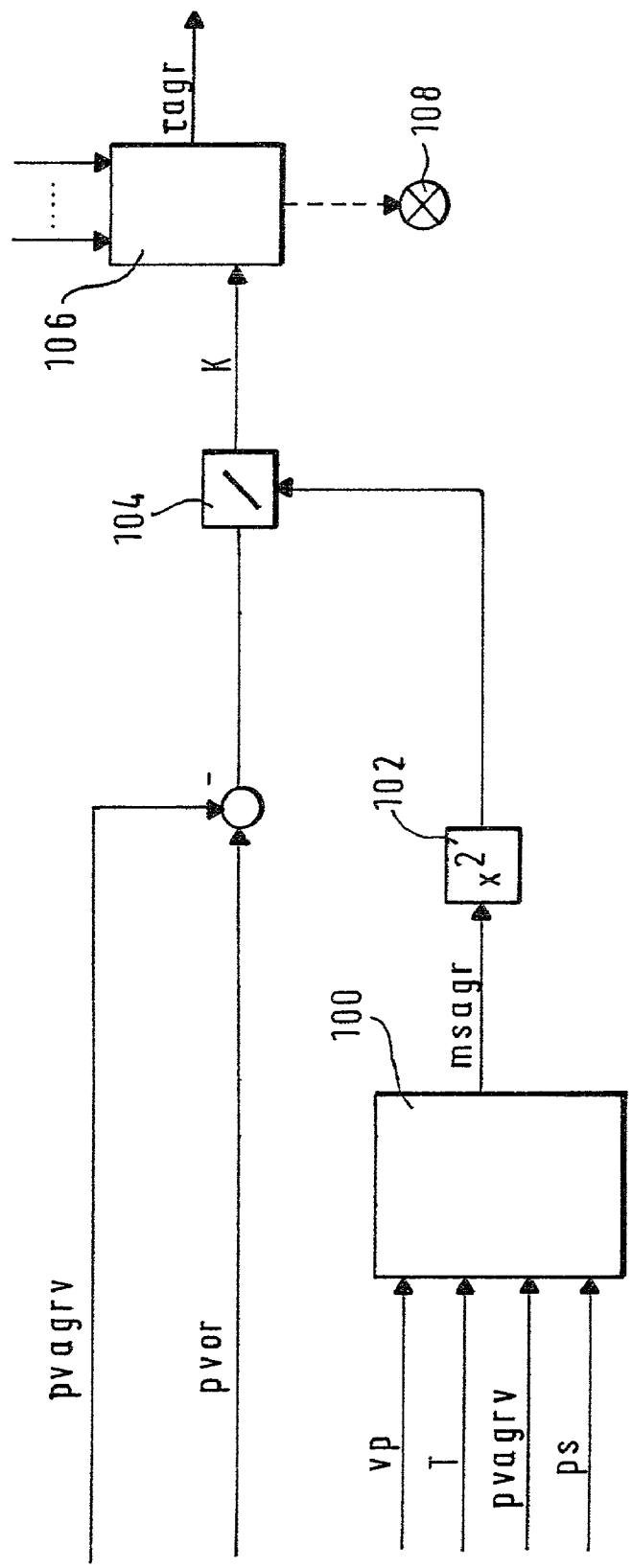
FIG. 3 depicts a first flow chart in which, based on the example of an exhaust-gas recirculation system as the preferred exemplary embodiment, the determination of the correction value is laid out in detail on the basis of this specific application case.
Figure 4:
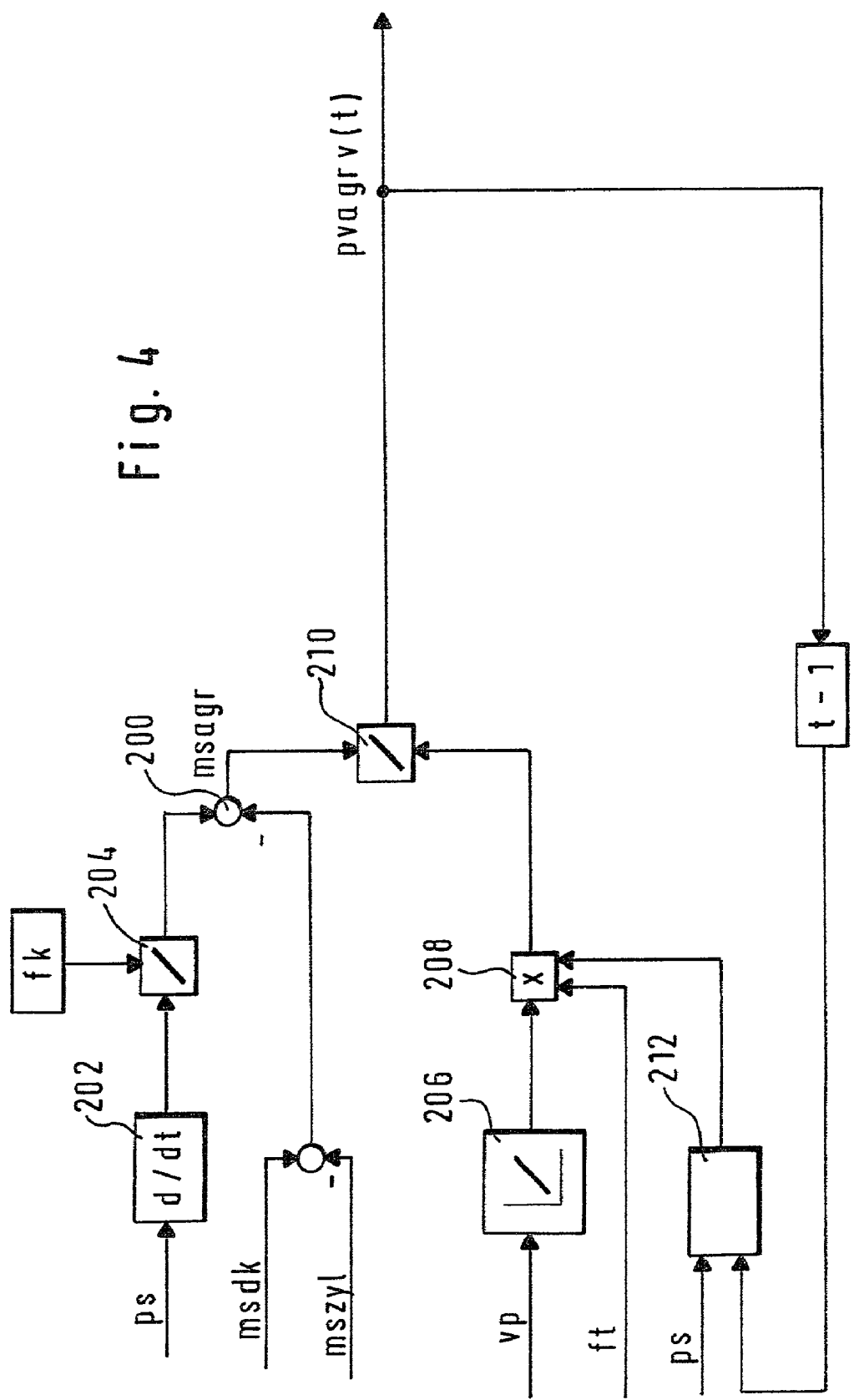
FIG. 4 depicts a second flow chart in which, based on the example of an exhaust-gas recirculation system as the preferred exemplary embodiment, the determination of the correction value is laid out in detail on the basis of this specific application case.

In FIGS. 3 and 4, flow charts are depicted which represent the determination of correction value K in the preferred exemplary embodiment of an exhaust gas recirculation system. In this context, the flow charts represent the structure of a computer program, which carries out the depicted calculations. In this context, the individual elements of the flowchart represent programs, program parts, or program steps, which realize the described function, whereas the lines represent the information flow.

Mass flow msagr through the exhaust gas recirculation line is calculated as follows (see also the related art cited above):

$$msagr=M(vp)*ft*(pvagrv/1013hPa)*KLAF(pvagrv/ps)$$

in this context, vp being the valve position of the exhaust gas recirculation valve, M the value's characteristic curve (mass over valve position), ft a correction value as a function of the temperature of the flowing gas, pvagrv the pressure upstream of the exhaust gas recirculation valve, ps the pressure downstream of the exhaust gas recirculation valve, i.e. the intake manifold pressure, and KLAF the flow characteristic curve of the line.

Thus, using this equation, if the variables are known, the mass flow across the valve can be calculated.

A further calculation value for the mass flow across the exhaust gas recirculation valve makes available an intake manifold model. This describes the intake manifold pressure as a function of the mass flows in the intake manifold. The following applies, e.g.:

$$ps=fk*Integral(msagr+msdk-mszyl)$$

ps being the intake manifold pressure, msagr the mass flow across the exhaust gas recirculation valve, msdk the mass flow across the throttle valve in the intake manifold, mszyl the mass flow flowing into the cylinder, and fk a conversion factor.

On the basis of this equation, the mass flow across the exhaust gas recirculation valve can also be calculated, assuming that the mass flows over the throttle valve, the flowing mass flow, and the intake manifold pressure are known. These mass flow values are measurable, or they are calculated, for example, in accordance with familiar modes of operation.

For the fault model of a restrictor in an exhaust gas recirculation line, the following relationship is assumed:

$$(Pvor-Pnach)=K*msagr*msagr$$

pvor representing the exhaust gas pressure upstream of the restrictor (pein in the example in FIG. 2), pnach the exhaust gas pressure downstream of the restrictor (in the example in FIG. 2), K the line resistance (K in the example in FIG. 2), and msagr the mass flow across the restrictor (ms in the example of FIG. 2).

If it is assumed that the restrictor arises between the sampling point of the exhaust gas mass flow in the exhaust system and the exhaust gas recirculation valve, then it roughly obtains that the exhaust gas pressure downstream of restrictor pnach is the pressure upstream of exhaust gas recirculation valve pvagrv. Therefore, if the exhaust gas pressure upstream of restrictor pvor (exhaust gas counterpressure) is measured or modeled using appropriate methods, then, on the basis of the fault model, line resistance K of the restrictor can be calculated directly. It is not necessary to use integrators. In this context, the calculation is carried out by converting the above relationship:

$$K=(Pvor-Pnach)/(msagr*msagr)$$

it being important to know pressure pnach upstream of the valve. It is determined iteratively on the basis of the equations cited above:

$$\text{Pnach}=\text{pvagrv}(t)=(dps/(fk-msdk+mszyl)*1013hPa/(M(vp)*ft*KLAF(pvagrv(t-1)/ps).$$

Line resistance K of the restrictor, calculated in this manner, is evaluated for correcting the control signal for the exhaust gas recirculation valve and/or for diagnosing the exhaust gas recirculation system, the correction value, for example, being compared to a preestablished threshold value. If the correction value exceeds this threshold value, then this is an indication that the line cross-section is significantly restricted by fouling and that, in this way, the normal functioning of the exhaust gas recirculation system can no longer be assured. In this case, an appropriate fault indicator is switched on. In another exemplary embodiment, the correction value is used for correcting the driving of the exhaust gas recirculation valve. In this context, the correction factor is brought to bear for increasing the drive signal and, in this context, for opening the valve wider, i.e., there exists a preestablished relationship between the drive signal variable and the correction value, which, as a result of an increasing correction value, brings about an increase in the drive signal and is used as the precontrol value in the control loop of the mass flow of the exhaust gas recirculation system.

It is important that during the operation of the engine, a correction value be spontaneously available, without it being necessary to adopt a stationary condition.

The flowchart in FIG. 3 depicts the aforementioned calculation of correction factor K. In 100, in accordance with the equation cited above, on the basis of the input variables, valve position vp, temperature T of the exhaust gas, the pressure upstream of valve pvagrv, intake manifold pressure ps, mass flow msagr across the exhaust gas recirculation valve are determined. The latter is exponentiated in 102 and is then supplied to division location 104. In the latter, factor K is calculated by dividing the difference between exhaust gas counterpressure pvor and pressure pvagrv upstream of the valve by the square of mass flow msagr. In 106, drive signal tagr, which is calculated as a function of various operating variables, is corrected and/or, in the event that a threshold value is exceeded, a fault indicator 108 is switched on, and/or corresponding information is stored in the fault storage unit.

FIG. 4 depicts a flowchart for determining pressure pvagrv upstream of the exhaust gas recirculation valve. In accordance with the aforementioned equations, a mass flow msagr across the valve is calculated in differential location 200. There, the temporal derivation of intake manifold pressure ps (calculated in 202), which in division location 204, using correction factor fk, is converted to mass flow values, and the difference between the air mass flows flowing over the throttle valve (msdk) and into the cylinder (mszyl) is calculated. In addition, from valve position vp a further mass flow value msagr is calculated, taking into account flow characteristic curve M 206, by multiplying, in multiplication location 208, by a temperature-dependent correction value ft and the quotient of intake manifold pressure ps and pressure (pvagrv(t−1) upstream of the valve of the previous calculation. The two mass flow values are divided by each other in division location 210 and, in this way, they yield instantaneous pressure pvagrv(t), which predominates upstream of the valve. For the next calculation step, this is fed back to element 212.

What is claimed is:

1. A method for at least one of controlling and diagnosing a control system that influences a mass flow, comprising:
    calculating a correction value by deriving the correction value from a calculated line resistance of a mass flow line, wherein at least one of the following is true:
    the correction value corrects the controlling of the mass flow, and
    a fault detection occurs as a function of the correction value, and wherein:
    in the mass flow line, there is a control element that influences the mass flow, and
    the correction value is calculated from a pressure upstream of the control element and from an intake pressure of the mass flow line.

2. A method for at least one of controlling and diagnosing a control system that influences a mass flow, comprising:
    calculating a correction value by deriving the correction value from a calculated line resistance of a mass flow line, wherein at least one of the following is true:
    the correction value corrects the controlling of the mass flow, and
    a fault detection occurs as a function of the correction value, and wherein:
    in the mass flow line, there is a control element that influences the mass flow, and
    the correction value is used for correcting a drive signal of the control element by maintaining a mass rate of flow even if the calculated line resistance increases.

3. A method for at least one of controlling and diagnosing a control system that influences a mass flow, comprising:
    calculating a correction value by deriving the correction value from a calculated line resistance of a mass flow line, wherein at least one of the following is true:
    the correction value corrects the controlling of the mass flow, and
    a fault detection occurs as a function of the correction value, and wherein:

the correction value is calculated from an exhaust gas back pressure and an exhaust gas pressure upstream of a control element, as well as from a mass flow across the control element.

4. A method for at least one of controlling and diagnosing a control system that influences a mass flow, comprising:
calculating a correction value by deriving the correction value from a calculated line resistance of a mass flow line, wherein at least one of the following is true:
the correction value corrects the controlling of the mass flow, and
a fault detection occurs as a function of the correction value, and wherein:
in the mass flow line, there is a control element that influences the mass flow, and
a calculation of the pressure upstream of the control element is carried out in an iterative manner in accordance with a mass flow in an intake manifold and a flow condition in an exhaust gas recirculation line.

* * * * *